(12) United States Patent
Hagmann et al.

(10) Patent No.: US 7,229,397 B2
(45) Date of Patent: Jun. 12, 2007

(54) TOOL CHANGING DEVICE FOR A MACHINE TOOL AND METHOD FOR CHANGING TOOLS ON A MACHINE TOOL

(75) Inventors: Michael Hagmann, Göppingen (DE); Friedrich Winckler, Schwäbisch Gmünd (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 0 days.

(21) Appl. No.: 11/344,599

(22) Filed: Jan. 31, 2006

(65) Prior Publication Data

US 2006/0217251 A1 Sep. 28, 2006

Related U.S. Application Data

(63) Continuation of application No. PCT/EP2004/008237, filed on Jul. 23, 2004.

(30) Foreign Application Priority Data

Aug. 5, 2003 (DE) ................. 103 37 547

(51) Int. Cl.
*B23Q 3/155* (2006.01)
(52) U.S. Cl. .................. 483/46; 483/34; 483/40; 483/41; 483/42; 483/43; 483/64
(58) Field of Classification Search .............. 483/46, 483/50, 51, 39, 40, 41, 42, 43, 44, 45, 47, 483/48, 49
See application file for complete search history.

(56) References Cited

U.S. PATENT DOCUMENTS

| 3,932,924 | A | * | 1/1976 | Anderson | 483/1 |
|---|---|---|---|---|---|
| 4,227,296 | A | * | 10/1980 | Wittenbreder | 483/46 |
| 4,312,111 | A | * | 1/1982 | Peiser et al. | 483/46 |
| 4,318,665 | A | * | 3/1982 | Carroll et al. | 414/728 |
| 4,403,391 | A | * | 9/1983 | Peacock | 483/46 |
| 4,443,928 | A | * | 4/1984 | Kielma | 483/46 |
| 4,459,737 | A | * | 7/1984 | Mori et al. | 483/46 |
| 4,505,020 | A | * | 3/1985 | Kinoshita | 483/64 |
| 4,637,120 | A | * | 1/1987 | Geiger | 483/46 |
| 4,654,954 | A | * | 4/1987 | Bayes et al. | 483/40 |
| 4,670,965 | A | * | 6/1987 | Sato et al. | 483/46 |
| 4,773,152 | A | * | 9/1988 | Kitamura | 483/46 |
| 4,860,429 | A | * | 8/1989 | von Haas | 483/43 |
| 4,942,657 | A | * | 7/1990 | Mihara et al. | 483/34 |
| 5,093,978 | A | * | 3/1992 | Binder | 483/43 |
| 5,131,136 | A | * | 7/1992 | Uchida et al. | 483/5 |
| 5,474,514 | A | | 12/1995 | Rütschle et al. | |
| 5,496,249 | A | * | 3/1996 | Buggle et al. | 483/41 |
| 5,688,084 | A | | 11/1997 | Fritz et al. | |
| 5,885,200 | A | * | 3/1999 | Sugihara et al. | 483/41 |
| 5,908,374 | A | * | 6/1999 | Kato | 483/42 |
| 6,579,216 | B2 | | 6/2003 | Germerodt et al. | |

FOREIGN PATENT DOCUMENTS

| DE | 2 211 123 | 10/1972 |
|---|---|---|
| DE | 42 13 684 A1 | 9/1993 |
| DE | 198 51 264 A1 | 5/2000 |
| JP | 54 099280 A | 8/1979 |

* cited by examiner

*Primary Examiner*—Dana Ross
(74) *Attorney, Agent, or Firm*—Alston & Bird LLP (57) ABSTRACT

A tool changing device for a machine tool with at least one tool carrier is proposed, which comprises at least one transit station, into which a tool is introducable in an inward transit direction and is extractable in an outward transit direction, wherein, at the transit station, the tool is at least one of detachable from the assigned tool carrier and fixable to the tool carrier provided.

36 Claims, 7 Drawing Sheets

TOOL CHANGING DEVICE FOR A MACHINE TOOL AND METHOD FOR CHANGING TOOLS ON A MACHINE TOOL

CROSS REFERENCE TO RELATED APPLICATIONS

This application is a continuation of international application PCT/EP2004/008237, filed on Jul. 23, 2004, and also claims the benefit of German Application No. 103 37 547.3, filed Aug. 5, 2003, both of which are incorporated herein by reference in their entirety and for all purposes.

BACKGROUND OF THE INVENTION

The invention relates to a tool changing device for a machine tool with at least one tool carrier and to a machine tool, which is provided with a tool changing device. The invention also relates to a method for changing tools on a machine tool with at least one tool carrier, in which detached tools are deposited in a tool storing apparatus and tools to be fixed are supplied from the tool storing apparatus.

In the case of a machine tool and in particular a machining center, as described, for example in EP 0 614 724 B1, a plurality of various tools may be used, in order to be able to carry out different machining processes on one or more workpieces. Irrespective of this, tools have to be exchanged because of wear.

It should be possible to carry out a tool exchange on a tool carrier with a minimized stoppage time for the machine tool.

SUMMARY OF THE INVENTION

In accordance with the invention, a tool changing device is provided, which is configured in a simple manner and with which a tool exchange can be carried out in a simple manner. In accordance with the invention, the tool changing device comprises at least one transit or pass-through station, into which a tool can be introduced in an inward transit direction and can be extracted in an outward transit direction, wherein, at the transit station, the tool can be detached from the assigned tool carrier and/or can be fixed to the tool carrier provided.

A simple tool exchange can be carried out by means of the solution in accordance with the invention. The transit station can be arranged, for example, rigidly or linearly displaceably with respect to a machine frame. It is no longer necessary for a gripper, for example, to have to fetch a tool from the tool carrier or bring it to it. The tool carrier, which is generally itself configured to be movable, can move to the transit station, to deliver a tool or to fetch a tool. The transit station can therefore be arranged in a defined position or with a small room for movement with respect to the machine tool, and in particular be arranged such that it is free of collision with respect to the tool carrier(s). In the case of a transit station of this type, depositing of tools in a tool storing apparatus or fetching from the tool storing apparatus can also easily be achieved, as a corresponding transporting apparatus can be arranged outside the room for movement of the tool carrier(s).

Owing to a defined inward transit direction and a defined outward transit direction, a tool can easily be fetched from a tool carrier and supplied to a tool storing apparatus or a tool can be fetched from the tool storing apparatus and supplied to the tool carrier.

Owing to the provision of a plurality of transit stations, it is also possible, for example, to provide fetching stations for supplying tools to the tool carrier(s) and bringing stations for delivering tools from the corresponding tool carriers. Stoppage times for the machine tool can thus be minimized during the tool exchange, as a new tool can be held in readiness when an old tool is detached from a tool carrier.

Preferably, in this case, at least one transit station is assigned to the at least one tool carrier. Fetching of a tool by the tool carrier and bringing of a tool by the tool carrier can then therefore be controlled thereby in a simple manner, as the latter only has to approach the assigned transit station or assigned transit stations.

In particular, at least one transit station is assigned to each tool carrier. A tool change can then be carried out in a defined manner for each tool carrier in a machine tool with a plurality of tool carriers, for example a multi-spindle machine tool.

It is favorable if the inward transit direction, when introducing a tool into the at least one transit station to detach the tool from the assigned tool carrier, and the outward transit direction, when extracting a tool fixed to a tool carrier from the transit station or a further transit station, are substantially oriented in opposite directions. There are then defined directions at the machine tool, with it being possible to implement the corresponding inward transit or outward transit of the tool by means of linear movements.

For the same reason, it is advantageous if the outward transit direction, when extracting a tool detached from a tool carrier from the at least one transit station, and the inward transit direction, when introducing a tool for fixing to the tool carrier provided into the transit station or a further transit station, are substantially oriented in opposite directions.

It is quite particularly advantageous, when a first transit station for detaching a tool from the tool carrier and a second transit station for fixing a tool to the tool carrier are assigned to the at least one tool carrier. Stoppage times during a tool change can thus be minimized, as a new tool can be held in readiness in the second transit station when the old tool at the first transit station is detached from the corresponding tool carrier. The first transit station and the second transit station, in this case, are preferably arranged adjacently, so the travel movement of the tool carrier is minimized, once the tool carrier has delivered its old tool and is to receive a new tool at the second transit station.

It is favorable when the inward transit direction and the outward transit direction at the at least one transit station form a transit direction (pass-through direction). The inward transit direction and the outward transit direction can coincide in this case or be spaced apart from one another in parallel, when the position of the transit station in an inward transit position and an outward transit position differs. A tool can then be pushed to a certain extent through the corresponding transit station, in order to deposit it in this manner after detachment from the tool carrier or, after supply from a tool storing apparatus, to fix it to a tool carrier and to guide it away with the tool carrier.

It is basically possible for the inward transit direction and the outward transit direction to lie transversely with respect to one another and, for example, to lie at an angle of 90° with respect to one another. If they form a single transit direction, i.e., if they lie in parallel or coincide, then it is also possible to achieve holding of the tool for detachment from the tool carrier or fixing to the tool carrier in a simple manner with respect to design. It is also favorable then, if the transit direction is a vertical direction, to configure the device in conjunction with a tool storing apparatus and a transporting apparatus for transportation of tools between the tool storing device and the at least one transit station in a space saving manner.

A space saving configuration can also be achieved when the transit direction for detaching a tool and passing it to a tool storing apparatus and the transit direction for introducing a tool from the tool storing apparatus and fixing the tool to the tool carrier provided are substantially oriented in opposite directions. This ensures that a tool carrier for a tool change in the region of the transit stations substantially only has to carry out a linear movement in the transit direction. This also applies to a transporting apparatus that delivers tools from the tool storing apparatus or fetches them from the corresponding transit station in order to supply them to the tool storing apparatus.

Advantageously, the at least one transit station is arranged in a movement space, or preferably at the edge of a movement space, of the at least one tool carrier. This makes it possible for the tool carrier to be able to deliver a tool to the transit station or fetch it therefrom. The transit station itself then no longer needs to be movable as a whole in order to be able to fetch a tool. However, it may be movable for removing a tool from the tool carrier or for inserting a tool on the tool carrier. As a result of this, a transporting apparatus for transporting tools between the tool storing apparatus and the transit station(s) can in turn be configured separately and, in particular, can be arranged outside the movement space. This ensures freedom from collisions. Moreover, the provision of tools and the detachment or fixing of tools can be at least partially decoupled with respect to tool carriers and this allows machine stoppages during a tool change to be reduced.

In a variant of an embodiment, the at least one transit station is rigidly arranged relative to a machine frame of the machine tool. A separation can thus be implemented between a movement space of the tool carrier(s) and a transporting space, in which a transporting apparatus moves and transports tools between the transit station(s) and a tool storing apparatus. The at least one tool carrier is movable, in this case, preferably transversely to the inward transit direction and outward transit direction, so a tool can be removed from the tool carrier by movement thereof or can be inserted on it by movement thereof.

In an alternative embodiment, the at least one transit station is movably arranged with respect to a machine frame of the machine tool. This embodiment is particularly advantageous when the at least one tool carrier has no mobility in a removal direction or insertion direction of the tool on the tool carrier. By means of a movement of the transit station, depending on the movement direction, a tool can then be removed from the tool carrier or a tool inserted on the assigned tool carrier.

The at least one transit station is then preferably displaceable transversely to the inward transit direction and outward transit direction, and, in particular, vertically displaceable with respect to these directions. By means of a movement of the transit station, a tool can then be removed from the tool carrier or a tool can be inserted in the assigned tool carrier. The tool changing device in accordance with the invention can then also be used, for example, on a tool machine, in which no mobility in the Z-direction is provided for the tool spindle or tool spindles, for example when the tool spindle or tool spindles are not configured as spindle sleeves.

It may be provided that the at least one transit station is arranged on a movable slide, the movement space of this slide preferably lying outside the movement space of the at least one tool carrier. The relative position between the at least one transit station and the at least one tool carrier can be changed by means of a movement of the slide. In this manner, a fixing apparatus and detachment apparatus for tools can be formed in the tool carrier. The movement space of the slide can be limited in this case, as only the mode of functioning of tool removal or tool insertion has to be ensured. The slide is preferably driven and, in this case, driven in a synchronized manner with a tool changing process, in order to now be able to carry out a tool change.

In particular, the at least one transit station is movable between an inward transit position and an outward transit position, in order to thus be able to fetch tools from the assigned tool carrier or deliver them thereto.

A tool is held by the assigned transit station, in particular, during the movement between the inward transit position and the outward transit position. An intermediate location, at which a tool is held, is thereby movably configured.

The at least one transit station is, in particular, connected to a tool storing apparatus, so tools can be supplied from the tool storing apparatus to the transit station and tools can be supplied from the transit station to the tool storing apparatus.

A supply location or delivery location for tools with respect to a tool carrier is provided by the at least one transit station. In order to connect this supply location or delivery location to a tool storing apparatus, a transporting apparatus advantageously moves for the transportation of tools between the at least one transit station and the tool storing apparatus outside a movement space of the at least one tool carrier. This transporting space for tools, which corresponds to the movement space of the transporting apparatus, is then decoupled from the actual working space of the machine tool, in which the tool carriers are movable. The transporting apparatus can then be configured in a simple manner as it can fetch the tools at defined locations, namely the transit station(s) or the tool storing apparatus, or can deliver them at such defined and spatially fixed locations. The degrees of freedom with respect to the mobility of the transporting apparatus can thus be reduced, so the latter can in turn be configured more simply in terms of design. The transporting apparatus comprises, for example, a cross slide, which can be moved by corresponding guides in directions lying transversely with respect to one another.

Advantageously, a detachment apparatus for detaching a tool from a tool carrier is provided for the at least one transit station. For the same reason, it is favorable if a fixing apparatus for fixing a tool to a tool carrier is provided for the at least one transit station. A tool change can then be carried out, in this case, during transit through the corresponding transit station, in a simple manner. The detachment apparatus and the fixing apparatus can be formed by means of a movement apparatus for the at least one transit station.

In this context, it is advantageous if a tool is held in an intermediate location at the at least one transit station. This intermediate location, which is, in particular, spatially defined and may be rigid or movable, is used to detach a tool from a tool carrier or to fix it to a tool carrier. Holding of this type can be achieved in a simple manner in terms of design if the tool is positively held at the intermediate location. Corresponding gripper elements then grip the tool in such a manner that it does not fall from this intermediate location. A holding apparatus is provided, in particular, for this purpose, in order to hold the tool at an intermediate location.

It is favorable when, during a movement of the tool into an intermediate location, a movement of the tool in the opposite direction can be blocked. Falling out is thus prevented, in particular, for as long as the tool is not yet positively held in the intermediate location. This blocking may be brought about, for example, in that the tool is still held on the tool carrier, when it is pushed into the intermediate location or is held on a transporting apparatus such as a cross slide, when it is pushed into the intermediate location.

It is quite particularly advantageous when at least one separate bringing location (delivery or supply location) and fetching location are provided for the tool as intermediate locations. A tool, which has been delivered by a tool carrier for exchange can be held via a bringing location. A tool which has been delivered from the tool storing apparatus for tool change to a tool carrier can be held via a fetching location. Machine stoppage times for the tool change can be minimized by the provision of separate bringing locations and fetching locations.

A tool change can be carried out in a simple manner in terms of design when the holding apparatus comprises opposing corresponding gripper elements, by means of which a tool can be positively held. These gripper elements then hold the tool in order to be able to detach it from the assigned tool carrier or in order to be able to fix it to the tool carrier provided. If a tool is positively held between the corresponding gripper elements, the tool carrier can then be guided away. The gripper elements are, in this case, in particular, configured to be movable in such a way that introduction into an intermediate space is made possible and extraction is also made possible.

The gripper elements are, in particular, arranged to be rotatable for this purpose. It can be achieved, by means of a corresponding rotary movement or pivoting movement of the gripper elements, that a tool can be passed through the corresponding transit station. In specific rotary positions, inward or outward transit is possible and in other specific rotary positions, positive holding is possible.

It is favorable if a blocking apparatus is provided for blocking the rotary movement. It can be achieved during blocked rotary movement that a position of the gripper elements, in which the latter hold a tool in a positive manner, is secured.

For example, the blocking apparatus comprises a spring-loaded pawl, which can be immersed in a blocking receiver of a gripper element. The rotary movement of a gripper element can thus be blocked in a simple manner in terms of design. The pawl is adapted to the assigned gripper element, for example, in such a manner that a rotary movement is only allowed in one direction of rotation. This allows a transit station to be produced, in which a tool can only be passed through in one transit direction. For example, a blocking position is adjusted such that a specific application of force is necessary in order to release it. This application of force may then be applied, for example, via a tool carrier (tool spindle) during entry.

The gripper elements are, in particular, configured such that a rotary movement can be initiated via a movement of the tool. The movement of the tool in turn takes place via a tool carrier or via a transporting apparatus for tools. This allows automatic grasping of tools by the gripper elements. It is quite particularly advantageous if the shaping of the gripper elements is adapted to the tool to be held, in order to thus make positive holding possible.

In one embodiment, the gripper elements can be rotated in an angle range, which is a partial angle of 360°. In particular, the gripper elements can then be fork-shaped and arranged in a pivotable manner. The space requirement for such fork elements is relatively small.

In a further embodiment, the gripper elements can be rotated in a full angle range and are, in particular, rotatable. Transit including positive holding in an intermediate location can then be obtained via a corresponding peripheral rotary movement of the gripper elements. A corresponding rotary movement in the case of gripper elements of this type can be initiated in a simple manner in terms of design via a tool movement.

The axis of rotation of the gripper elements is preferably transverse and in particular vertical to the transit direction, in order to thus make a transit with positive holding possible in an intermediate location. The gripper elements can be configured as gripper forks. It is also possible for the gripper elements to have a plurality of receivers for a tool, in each case. By rotating the gripper elements, positive holding can thus be achieved at an intermediate location. In particular, adjacent receivers are separated, in this case, by an arm. The gripper elements are then preferably star-shaped.

It is also advantageous if the directions of rotation of the opposing corresponding gripper elements are oriented in opposite directions. The spacing between corresponding points of the corresponding gripper elements can thus be changed, i.e., increased and reduced. This allows positive holding in one or more specific rotary positions of the gripper elements and, in other rotary positions, a release of this positive holding position, in order to thus be able to in turn transit a tool inwardly or outwardly.

A machine tool, for which a tool storing apparatus is provided, in particular, can be provided with the tool changing device in accordance with the invention. In accordance with the invention, a method is provided with which the machine stoppage times during tool change are minimized.

With this method, a tool is introduced in an inward transit direction into a transit station, at which the tool is detached from the assigned tool carrier or the tool is fixed to the tool carrier provided, and is extracted in an outward transit direction.

The method in accordance with the invention has the advantage already described in conjunction with the device in accordance with the invention. Further advantageous configurations have also already been described in conjunction with the device in accordance with the invention.

In particular, the inward transit direction and the outward transit direction are rigidly predetermined and are fixed spatially with respect to the machine tool. A defined fetching from the transit station or a defined bringing of tools to the transit station can thus be achieved. The inward transit direction and the outward transit direction at a transit station advantageously form a transit direction.

The following description of preferred embodiments is used in conjunction with the drawings for a more detailed description of the invention.

BRIEF DESCRIPTION OF THE DRAWINGS

In order to assist the understanding of embodiments of the invention, reference will now be made to the appended drawings, which are not necessarily drawn to scale, and wherein.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Figure 1:
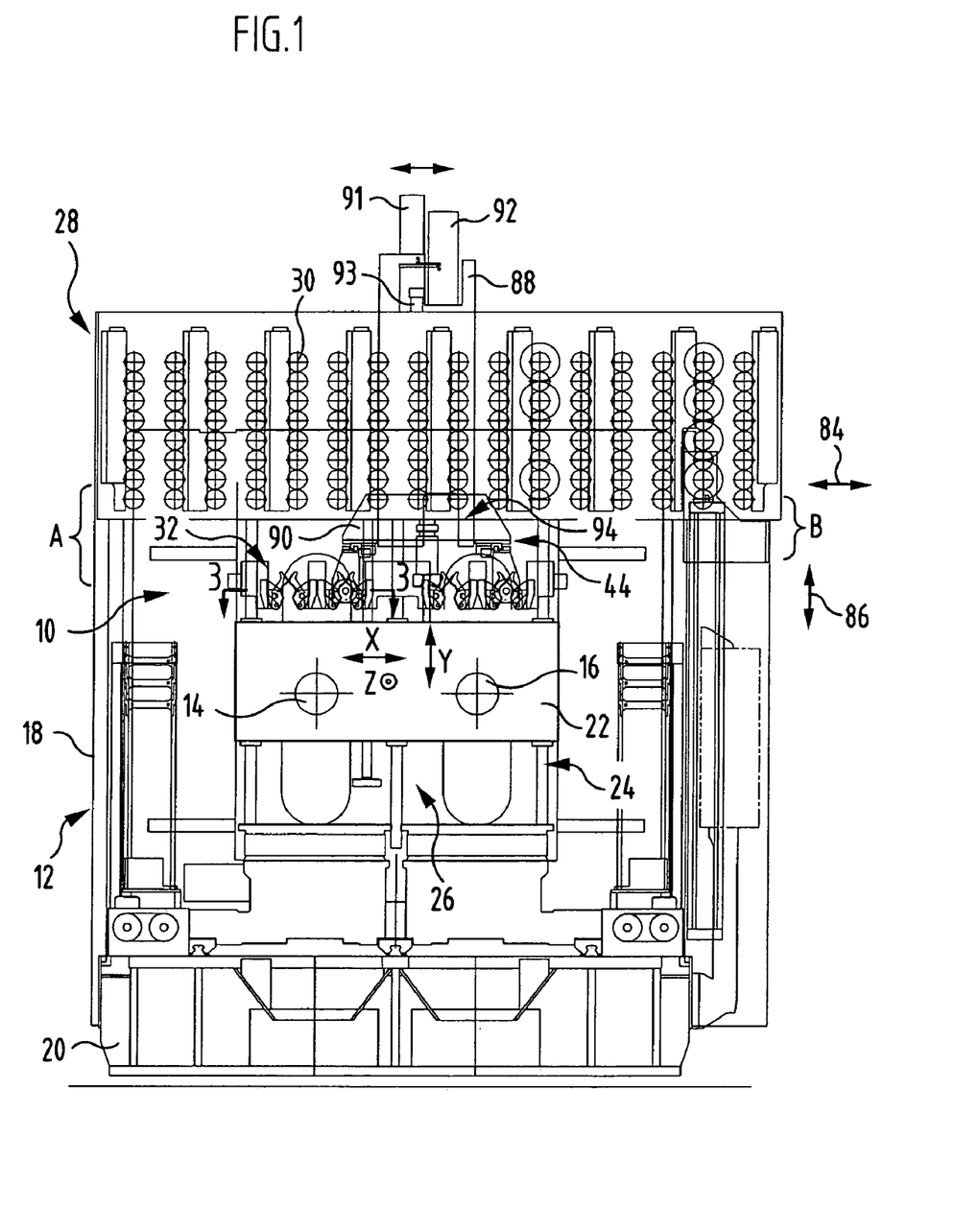
FIG. 1 shows a schematic front view of an embodiment of a machine tool, which is provided with an embodiment of a tool changing device in accordance with the invention.

The tool changing device in accordance with the invention, of which an embodiment is shown in FIG. 1 and is designated there as a whole by 10, is assigned to a machine tool designated as a whole by 12. The tool changing device 10 may, in this case, be an integral component of the machine tool 12 or be fitted thereto retrospectively. In the embodiment shown in FIG. 1, the machine tool is a two-spindle tool, which, as tool carriers 14 and 16, comprises tool spindles, in each case.

The tool changing device according to the invention can basically be used on all types of machine tools with movable tool carriers. The tool carriers 14 and 16 may be non-movable in the Z-direction (which lies transverse to the plane of the drawing in FIG. 1) or be configured as spindle sleeves, which are displaceable along their longitudinal axis (the Z-direction).

The machine tool 12 comprises a machine frame 18 with a machine bed 20. The machine frame 18 is erected in a fixed manner. The tool carriers 14, 16 are movably guided with respect to the machine frame 18 in the X-direction and Y-direction. For this purpose, in the embodiment shown in FIG. 1, a tool carrier slide 22 is provided, which holds the two tool carriers 14 and 16. This tool carrier slide 22 is displaceably guided in turn, for example in the vertical direction, on a guide apparatus 24. Further tool carrier slides 22 may be provided, in order to also ensure mobility of the tool carriers 14, 16 in a transverse direction. The guide apparatus 24 is rigidly arranged with respect to the machine frame 18.

The tool carriers 14, 16 have a movement space 26, which is determined by the mobility of the tool carrier slide(s) 22 and optionally of the tool carriers 14, 16 in the Z-direction.

A tool storing apparatus 28, in which a plurality of tools are stored, is provided; these tools are indicated by the reference numeral 30 in FIG. 1. Tools can be changed on the tool carriers 14, 16 by the tool changing device 10, with it being possible to supply tools for depositing to the tool storing apparatus 28 and it being possible to supply tools from the tool storing apparatus 28 for changing.

Figure 4:
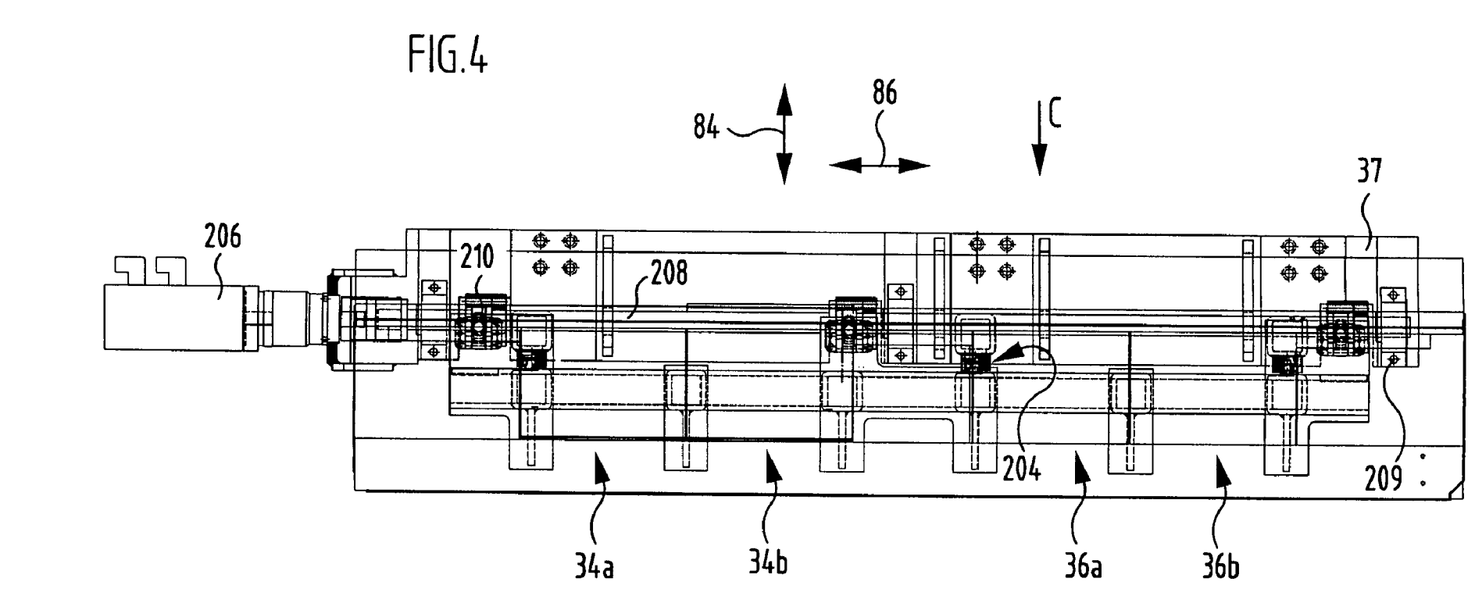
FIG. 4 shows an enlarged sectional view of the region B according to FIG. 1 with a transporting apparatus for tools.
Figure 5:
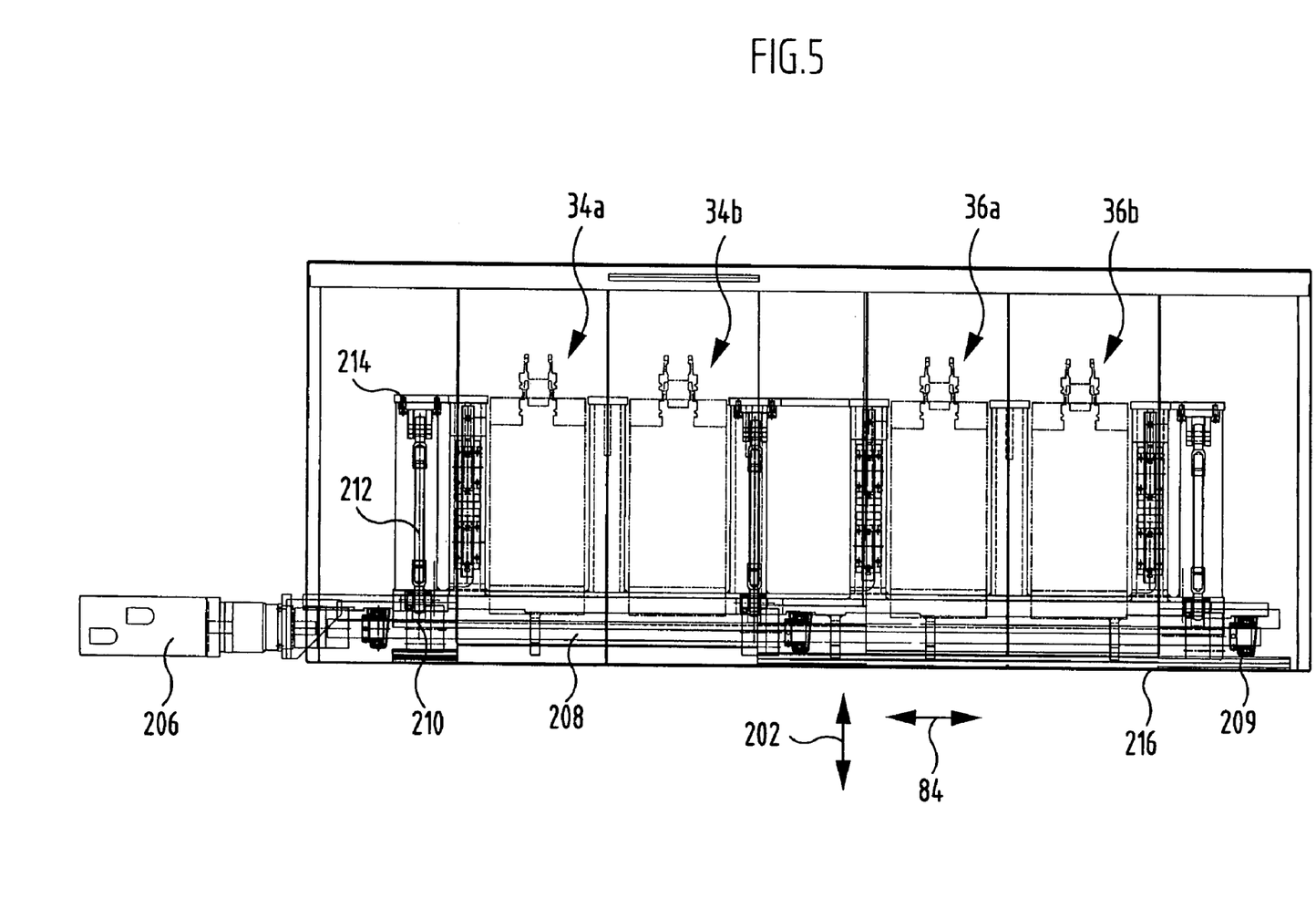
FIG. 5 shows a plan view in the direction C according to FIG. 4 of the transporting apparatus.

The tool changing device 10 has, in accordance with the invention, at least one transit station 32, which may be arranged rigidly or movably with respect to the machine frame 18. In the embodiment shown, the tool carriers 14 and 16 are assigned their own transit stations 34a, 34b and 36a, 36b, in each case, which sit on a slide 37 (FIGS. 4 and 5).

The two-spindle tool thus has four transit stations 32.

For the tool carrier 14, the transit station 34a is a fetching station, via which the tool carrier 14 can fetch a tool. The transit station 34b is configured as a bringing station (delivery or supply station), to which the tool carrier 14 can bring a tool, in order to carry out a tool change. The same circumstances apply to the tool carrier 16 with its assigned transit stations 36a and 36b.

It is basically possible for a transit station 32 to be configured both as a fetching station and a bringing station, via which a tool can be supplied to the corresponding tool carrier and via which an exchanged tool can be guided away from the tool carrier. If separate transit stations 34a, 34b or 36a, 36b are provided for fetching and bringing, a tool exchange can be carried out more quickly, as, for example, during a bringing process, a new tool can already be waiting in the fetching station or can be delivered to the latter. Tool changing times can thus be shortened.

The transit station 34a, as a fetching station, has an inward transit direction 38, in which a tool 40 can be introduced into the transit station 34a. The tool 40 is delivered from the tool storing apparatus 28 via a transporting apparatus 42, which comprises, for example a cross slide 44. During inward transit, this transporting apparatus 42 holds the tool 40.

The tool 40 leaves the transit station 34a in an outward transit direction 46. This outward transit direction 46 preferably coincides with the inward transit direction 38 or is parallel thereto, so the tool 40 can be passed through in a transit direction 48 through the transit station 34a. When the tool 40 is extracted from the transit station 34a in the outward transit direction 46, it fits on the tool carrier 14. In the transit station 34a, the tool 40 is fixed to the tool carrier 14. For this purpose, a fixing device, designed as a whole by 50, is provided.

As described in more detail below, the outward transit direction 46 and the inward transit direction 38 can be offset in parallel owing to a transverse movement of the transit station 34a, between the inward transit position and the outward transit position.

The adjacent transit station 34b, which is configured as a bringing station, has an inward transit direction 52, which opposes the inward transit direction 38. A tool 54, which sits on the tool carrier 14, can be introduced in this direction 52 into the transit station 34b.

The tool 54 is detached from the tool carrier 14 in the transit station. A corresponding detachment apparatus 56 is provided for this purpose.

The detached tool 54 can be guided from the transit station 34b in an outward transit direction 58, which opposes the outward transit direction 46. The outward transit direction 58 preferably coincides with the inward transit direction 52 or is parallel thereto, so a transit direction 60 is present for the tool 54 through the transit station 34b. This transit direction 60 opposes the transit direction 58 of the fetching station 34a.

As is described below in more detail, the outward transit direction 58 and the inward transit direction 52 can be offset in parallel owing to a transverse movement of the slide 37, between the inward transit position and outward transit position.

During outward transit of the tool 54 in the outward transit direction 58, the latter is held by the cross slide 44. It is then supplied to the tool storing apparatus 28 for depositing.

The same circumstances apply correspondingly to the transit stations 36a and 36b, which are assigned to the tool carrier 16.

In the embodiment shown, the transit directions 48 and 60 are parallel to the movement direction of the tool carrier slide 22 (in the Y-direction). Tools can thus be fetched or brought by movement of the tool carrier 14, 16 via the tool carrier slide 22.

Each transit station 32 comprises a holding apparatus 62, in order to hold a tool 30 or 54 in an intermediate location 64 or 66. In the transit station 34a, the tool 40 is held in the intermediate location 64 by the assigned holding apparatus 62, in order to be able to fix it to the tool carrier 14. The tool 54 is held in the intermediate location 66 of the transit station 34b, in order to be able to detach it from the tool carrier 14 and to then hold it after detachment. The tool 40 is guided at the transit station 34a in the transit direction 48 through the intermediate location 64. The tool 54 is guided in the transit station 34b in the transit direction 60 through the intermediate location 66.

Figure 2:
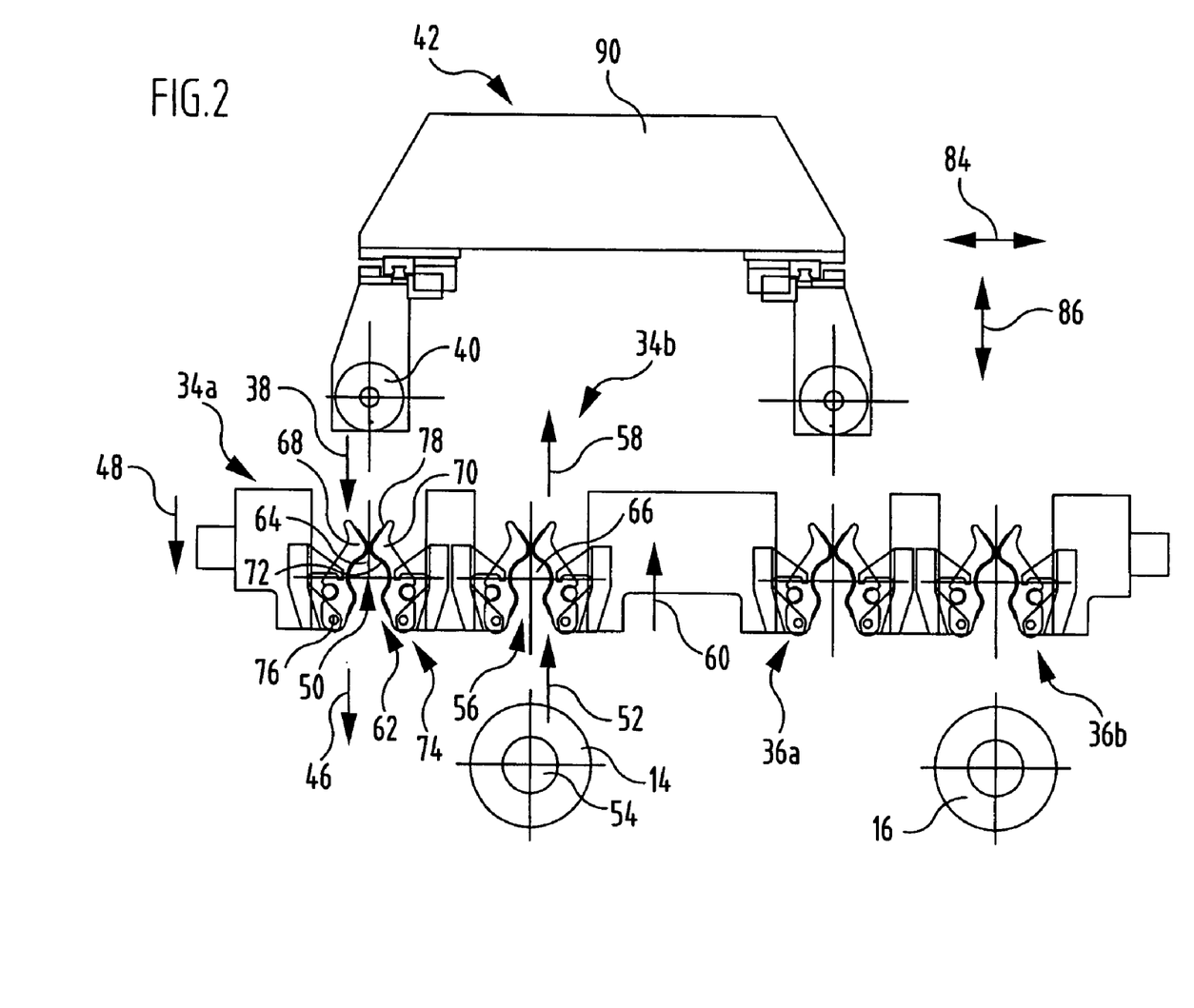
FIG. 2 shows an enlarged view of part elements of the tool changing device from the region A according to FIG. 1.

The holding apparatus 62, in each case, comprises opposing gripper elements 68, 70, which are forked-shaped in the embodiment shown in FIG. 2. The gripper elements 68, 70 are rotatably or pivotably mounted here, in each case. Their axes of rotation lie transversely and, in particular vertically, with respect to the transit direction 48.

The gripper elements 68, 70, in this case have directions of rotation or pivoting directions, which are opposed to one another. In a movement of the two gripper elements 68, 70 these then either move toward one another or away from one another.

Owing to the gripper elements 68, 70, the tool 40 can be positively held at the intermediate location 64. The gripper elements 68, 70 are adapted, in this case, with respect to their shaping, accordingly to the tool 40. Together they form a receiver 72 which, to hold the tool 40 at the intermediate location 64, blocks a movement of the tool 40 from the intermediate location 64, i.e. blocks it with respect to the inward transit direction 38 and also in the outward transit direction 46. This blocking is caused in that the tool 40 rests on corresponding walls of the gripper elements 68, 70 delimiting the receiver 72.

In order to hold the tool 40 at the intermediate location 64 in this intermediate position, in which the tool 40 can be fixed to the tool carrier 14 via the fixing apparatus 50, a blocking device designated as a whole by 74 is provided, which prevents the gripper elements 68, 70 of the holding apparatus 72 rotating out of the holding position. For example, the blocking device 74 comprises suitable stop elements 76, in each case, for the gripper element 68 and the gripper element 70 which block a rotary movement of the gripper elements 68, 70. The stop element 76 can thus be controlled or switched, in this case, in such a way that a rotary movement of the gripper elements 68, 70, can be released, in order to be able to now guide the tool 40 fixed to the tool carrier 14 from the transit station 34a.

It is preferably provided that a rotary movement of the gripper elements 68, 70, can be initiated, via a movement and, in particular a linear movement of the tool 40. The gripper elements 68, 70 are configured accordingly. In the embodiment shown in FIG. 2, they have, in each case, surfaces 78, located at an angle based on the transit direction 38, in each case toward the transporting direction 42, when they are rotated toward one another. When the tool 40 is moved via the cross slide 44 into an intermediate location between the opposing surfaces 78 of the respective gripper elements 68, 70, this brings about a rotation away from one another of the gripper elements 68, 70 (when the blocking apparatus 74 is released). The tool 40 can thus be immersed in a trough-shaped region of the two gripper elements 68, 70, which then forms the receiver 72. When the tool 40 is located in the receiver 72, it can be ensured, for example, via spring loading that the gripper elements 68, 70 rotate toward one another again. This rotary position is fixed via the blocking apparatus 74. The tool 40 is now positively held in the intermediate location 64 in the receiver 72. It can then be fixed to the tool carrier 14, the tool carrier 14 being correspondingly brought to the tool 40, in order to be able to implement this fixing.

After fixing the tool 40 to the tool carrier 14, the blocking device 74 is released. The tool carrier 14 with the fixed tool 40 can then move away in the outward transit direction 46.

The transit station 34b basically functions in the same manner, the tool 54 being detached from the tool carrier 14 at this bringing station at the intermediate location 66. The detached tool 54 can then be moved away in the outward transit direction 58.

The tool carrier 14, which is then without a tool, is moved to the transit station 34a in order to be able to now receive the tool 40 there, as described above.

Figure 3:
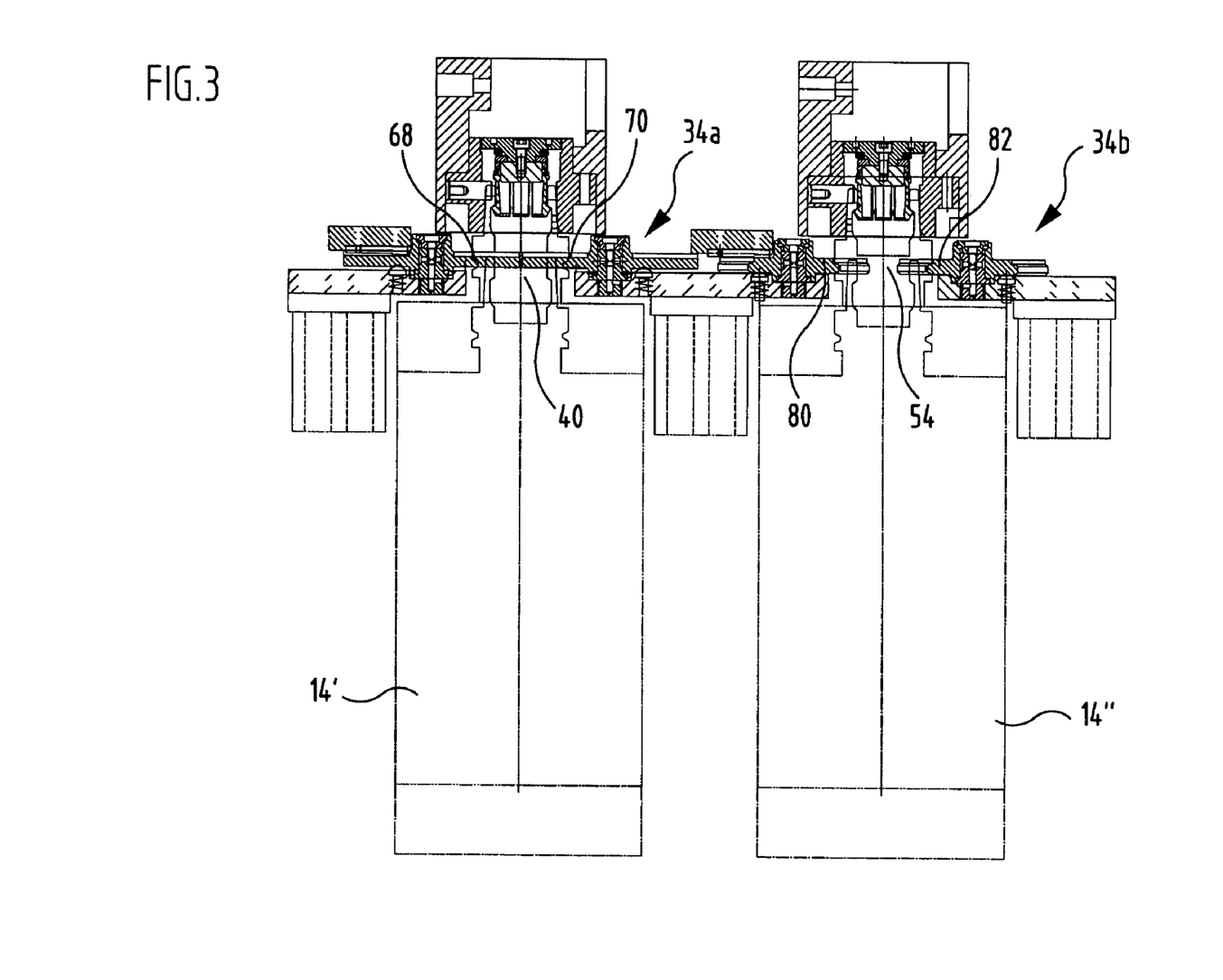
FIG. 3 shows a sectional view along the line 3—3 according to FIG. 1.

A sectional view is shown in FIG. 3, in which the gripper elements 68, 70 of the transit station 34a positively hold the tool 40. In this position, the tool 40 can be detached from the tool carrier 14'.

Next to this, a situation is shown for the transit station 34b, in which corresponding gripper elements 80, 82 are in a rotary position such that the tool 54 can be extracted upwardly after detachment from the tool carrier 14", upwardly in the outward transit direction 58. As the transit stations 34a and 34b are assigned in the example to a single tool carrier 14, the tool carrier, from which the tool 54 was detached, is designated 14' and 14" (i.e., the tool carriers 14' and 14" are the same tool carrier).

In the situation shown in FIG. 3, the tool carrier 14" is prepared for receiving a new tool (for example the tool 40). A tool exchange is carried out at the tool carrier 14'. This now carries the tool 40.

The transporting apparatus 42 with its cross slide 44 is movable outside the movement space 26 of the tool carriers 14, 16, so there is no risk of collision between the transporting apparatus 42 and the tool carriers 14, 16. The cross slide 44 is linearly displaceable, for example transversely in a direction 84 (parallel to the X-direction) and, in particular, vertically with respect to the transit directions 48, 60 and displaceable in a direction 86 (parallel to the Y-direction) parallel to the transit directions 48, 60 (FIGS. 2, 4, 5).

The transporting apparatus 42 is the binding member between the transit stations 32 and the tool storing apparatus 28. The cross slide 44 guides tools 30 from the tool storing apparatus 28 to the transit stations 32 and guides tools away from the transit stations 32 to the tool storing apparatus 28 for depositing. The tool changing device 10 is arranged with respect to the movement space of the tool carriers 14, 16 in such a way that the tool carriers 14, 16 can deliver tools or receive them. It is preferably arranged at the edge of the movement space 26. The cross slide 44 is guided outside the movement space 26 and for example above the transit stations 32. This is indicated in FIG. 4. The cross slide comprises a column 88, which can be displaced in the direction 84, on which a tool bringing/fetching slide 90 is guided in the direction 86.

The column 88 and the tool bringing/fetching slide 90 form the cross slide 44. The movement of the tool bringing/fetching slide 90 in the direction 86 is driven by a motor 91 arranged on the column 88. To move the column 88, a motor, which is arranged on the latter, is provided (FIG. 1). The motor 92 drives a threaded rod 93, which is oriented along the column 88; a pinion-toothed rack drive is provided for movement of the column 88. The column 88 is oriented in the example shown (FIG. 1) in the vertical direction (based on the direction of gravitational force). The tool-bringing/fetching slide 90 can be displaced with respect to height on the column 88 and can be displaced with the column 88 in the transverse direction 84. Tools 30 can be deposited in specific height positions in the tool storing apparatus 28 via a movement along the column 88.

Moreover, a guide 94 for the movement of the cross slide 44 along the direction 84 is provided by displacement of the column 88 (FIG. 1). This guide 94 is rigidly arranged with respect to the machine frame 18 and with respect to the transit stations 32. The guide plane for the guide 94, in this case, lies transversely and, in particular, vertically with respect to the transit directions 48, 60. The movement of the column 88 in the direction 84 is driven by means of the threaded rod 93, which is driven in turn by the motor 92. The threaded rod 93 is coupled accordingly to the guide 94 and the guide is configured in an adapted manner. The cross slide 44 can be brought into a respective defined position in the X-direction, via the movement in the direction 84, in order to supply a corresponding tool to the transit station 32 or to guide it away therefrom.

It can basically be provided that the transit stations 32 are arranged rigidly and in particular non-movably with respect to the machine frame 80. The tools are decoupled in the assigned tool carriers 14, 16 or the tools are coupled into the tool carriers 14, 16 when the corresponding tools are fixed in the assigned transit stations 32, by means of a movement of the tool carriers 14, 16 in the Z-direction; for this purpose, a corresponding mobility of the tool carriers 14, 16 in the Z-direction must be permitted. If the tool carriers 14, 16 are for example spindle sleeves, these can be moved in the Z-direction.

It may also alternatively be provided, that the transit stations 32, as shown in FIGS. 4 and 5, are arranged on a slide 37, which can be moved in a direction 202 parallel to the Z-direction. The removal of the tools from the assigned tool carriers 14, 16 or insertion, does not then take place via a movement of the tool carriers 14, 16 themselves, but via a movement of the slide 37. A movable slide 37 of this type is provided, in particular, when no Z-lift is provided for the tool carriers 14, 16.

The slide 37 is guided on a guide 204, which allows mobility in the direction 202. The slide 37 holds the transit stations 32; in the embodiment shown, it holds the transit stations 34*a*, 34*b* and 36*a* and 36*b*.

The movement space of the slide 37 preferably lies outside the movement space of the tool carriers 14, 16.

Provided for the movement of the slide 37 is a spindle motor 206 which drives a shaft 208. The shaft 208 is configured, for example, in the manner of a crankshaft, on which eccentric elements 210 are arranged, via which a rotational movement of the shaft 208 can be converted into a translatory movement. The shaft 208 is rotatably mounted on the machine frame 18 via bearings 209 and in a non-translational manner with respect to the machine frame 18.

The eccentric elements 210 are connected, for example, to a connecting rod 212, in each case, the connecting rod being connected in turn via pivot bearings 214 to the slide 37. By rotating the shaft 208, the slide 37 can be moved in the Z-direction relative to a fixed beam 216, on which the shaft 208 is mounted. The totality of the transit stations 32 can thereby be moved in turn relative to the tool carriers 14, 16 in the Z-direction.

If, for example, a tool is to be removed from the tool carrier 14, the slide 37 moves with the transit station 34*b* toward the tool carrier 14. When the tool is gripped in the transit station 34*b*, the slide 37 moves away from the tool carrier 14 and in the process decouples the corresponding tool from the tool carrier 14. The tool can then be gripped by the cross slide 44, in order to deposit it in the tool storing apparatus 28.

In order to insert a tool on the tool carrier 14, the corresponding tool is delivered from the tool storing apparatus 28 via the cross slide 44 to the transit station 34*a*, with it being gripped by the latter when the slide 37 is positioned away from the tool carrier 14. The slide 37 then moves in the Z-direction toward the tool carrier 14, which was previously brought into the corresponding X-Y-position. The tool is then inserted thereby in the tool carrier 14.

The movement direction of the slide 37 to remove and insert the tools is, in this case, preferably transverse and, in particular, vertical with respect to the transit directions 48, 60. When a slide 37, which can be moved in the Z-direction, is provided for the transit station 32, the inward transit position of a transit station and the outward transit position of a transit station are spaced apart from one another in the Z-direction. For example, the transit station 34*a* as a fetching station, has a greater spacing from the tool carrier 14 in the inward transit position, when a tool is coupled into the transit station 34*a* by the cross slide 44 from the tool storing apparatus 28, than in the outward transit position. When the tool is decoupled from the transit station 34*a*, the transit station 34*a* then lies closer to the tool carrier 14.

Accordingly, the transit station 34*b* as the bringing station lies closer to the tool carrier 14 when a tool is passed inwardly together with the tool carrier 14. In the outward transit position, in which a tool is removed by the cross slide 44 in order to supply it to the tool storing apparatus 28, the tool transit station 34*b*, in the Z-direction, is spaced apart from the inward transit position.

The fixing apparatus 50 for fixing a tool to a tool carrier and the detachment apparatus 56 for detaching a tool from a tool carrier comprise the movable slide 37 in order to thus allow feeding in and out.

In order to be able to carry out a tool change, the rotary movement of the shaft 208 is controlled. This control takes place in such a way that the slide 37 is accordingly provided when a tool or tools is or are delivered or provided from the tool storing apparatus 28 and when the tool carriers 14, 16 deliver tools to the tool changing device 10.

Figure 6:
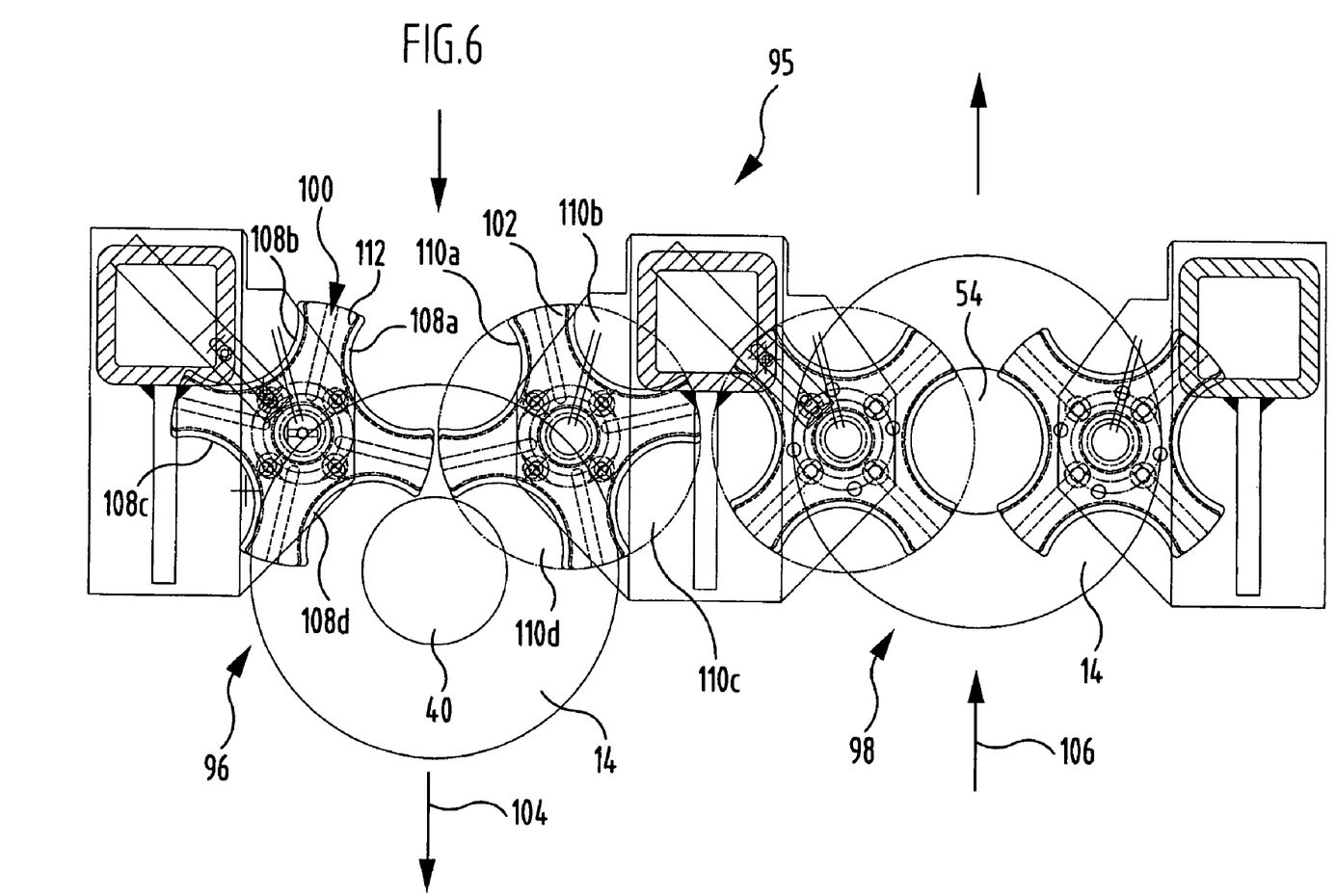
FIG. 6 shows a schematic view of an embodiment of gripper elements for holding tools.

In a further embodiment of a holding apparatus, which is shown schematically in a partial view in FIG. 6 and is designated as a whole there by 94, rotatable gripper elements 100, 102 are provided in each case at adjacent transit stations 96, 98. The transit station 96 is configured, for example, as a fetching station for the tool carrier 14 and the transit station 98 is configured, for example, as a bringing station for this tool carrier 14. (In FIG. 6, the same reference numerals are used for the elements of the machine tool as in FIG. 1.)

The transit station 96 has a transit direction 104, which is opposed to the transit direction 106 for the transit station 98. The transit directions 104, 106 are oriented, for example, parallel to the gravitational force direction.

The gripper elements 100, 102 are star-shaped in this example, with a plurality of receivers 108*a*, 108*b*, 108*c*, 108*d* for the gripper element 108 and with a plurality of corresponding receivers 110*a*, 110*b*, 110*c*, 110*d* for the gripper element 102. In the embodiment shown, four receivers are provided. More or less receivers may also be provided.

Adjacent receivers, such as for example the receivers 108a and 108b, are separated by an intermediate arm 112. They are trough-shaped at their respective intermediate arms 112.

The gripper elements 100, 102 are in each case rotatably mounted with an axis of rotation which is vertical with respect to the transit directions 104, 106. They can in this case, be rotated, in particular, about a full angle. The directions of rotation are opposing in each case, so corresponding intermediate arms 112 of the two gripper elements 100, 102, either move away from one another or toward one another.

The corresponding receivers of the two gripper elements 100, 102, for example the receivers 108a and 110a, are configured in such a way that the tool 40 is positively held at an intermediate location, in order to be able to fix the tool 40 to the tool carrier 14.

The gripper elements for the transit station 98 are correspondingly configured in order to be able to detach the tool 54 held on the tool carrier 14 at the intermediate location.

In order to prevent further rotation of the assigned gripper elements 100, 102 when the tool 40 or 54 is positively held at an intermediate location, a blocking apparatus is provided as described above, which now blocks the rotary movement of the gripper elements 100, 102. The tool 40 or 54 is then securely held.

Figure 7:
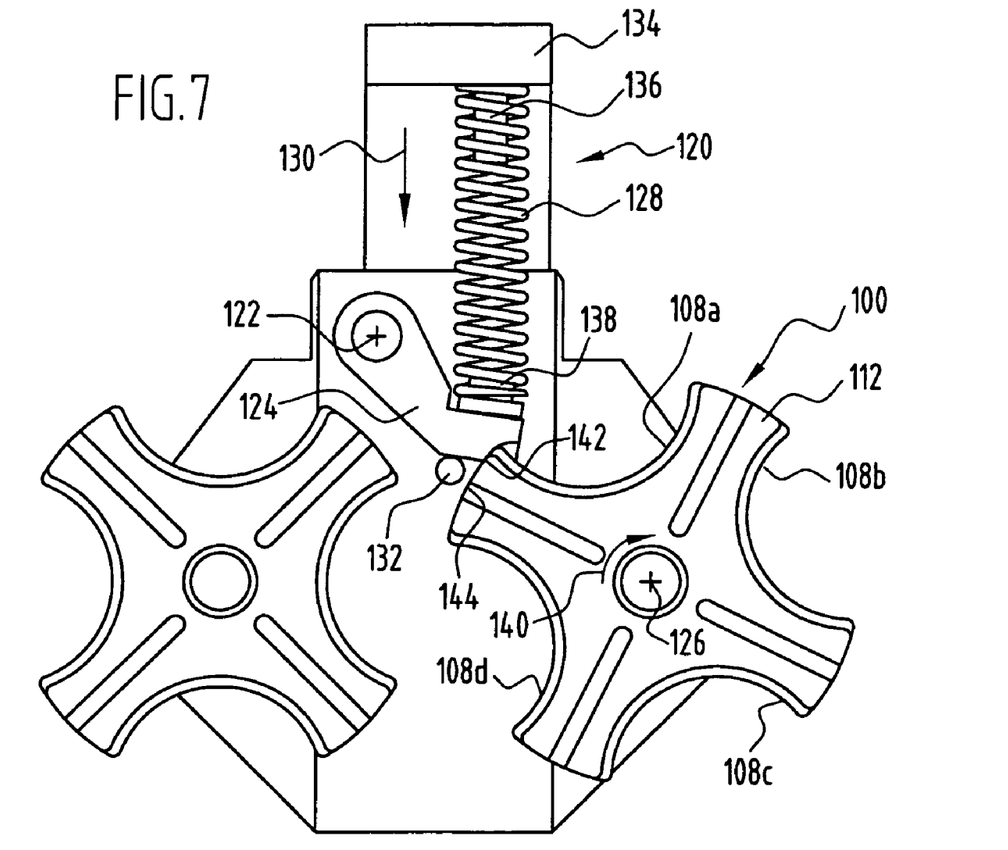
FIG. 7 shows a schematic view of an embodiment of a blocking apparatus for blocking the rotary movement of gripper elements in a non-blocking intermediate state.
Figure 8:
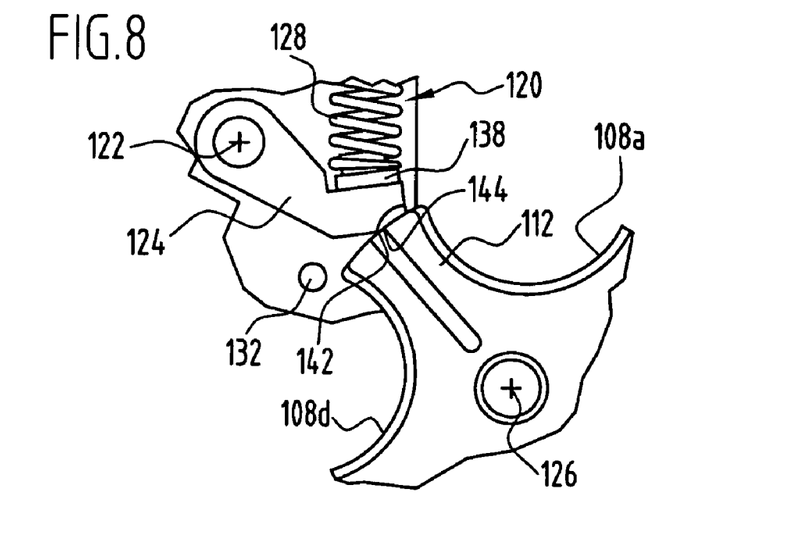
FIG. 8 shows a detailed view of the blocking apparatus according to FIG. 7 in a blocking position.

An embodiment of a blocking apparatus, which is shown in FIG. 7 and 8 and is designated as a whole by 120 there, comprises a pawl 124 rotatably mounted about an axis 122. The axis 122 lies parallel to an axis of rotation 126 of the assigned gripper element (in FIGS. 7 and 8, of the gripper element 100).

The pawl is spring-loaded via a compression spring 128. The spring force acts in a direction 130, which, in the embodiment shown, is substantially parallel to the gravitational force direction. The compression spring 128 exerts a torque on the pawl 124, via which the latter is pressed against a contact element 132.

The compression spring 128 is supported for this purpose on a support element 134 with a holding pin 136 and is pushed on to a holding pin 138 of the pawl 124.

FIG. 7 shows a position of the pawl 124, in which the latter rests on the contact element 132. In this position, a rotation of the gripper element 100 in a direction of rotation 140 is possible, and to be precise, until an immersion region 142 is immersed in a blocking receiver 144 of the gripper element 100 (FIG. 8). The pawl 124 is pivoted via the gripper element 100 about the axis 122 in the direction counter to the direction of rotation 140 by means of the rotation of the gripper element 100 in the direction of rotation 140 and, in this case, the compression spring 128 is compressed. When the immersion region 142 is immersed in the blocking receiver 144, the compression spring 128 presses this immersion region 142 into the assigned blocking receiver 144 and thus ensures (non-positive) fixing of the gripper element 100 in a specific rotary position.

The blocking can be eliminated in that a torque is exerted, in particular via a tool carrier such as a tool spindle, on the gripper element 100, so the immersion region 142 is lifted from the blocking receiver 144. The pawl 124 is configured at the immersion region 142 and in the vicinity thereof in such a way that such lifting out from the blocking receiver 144 is made possible. The blocking receiver 144 is also configured in a correspondingly adapted manner.

When the corresponding intermediate space 112, at which the blocking receiver 144 is configured, is rotated beyond the region of the pawl 124, the compression spring 128 then presses the pawl 124 in turn onto the contact element 132; a blocking of further rotation can then be achieved at the next rotary position to hold a tool.

Otherwise, the holding apparatus 94 functions as described above for the holding apparatus 62.

According to the invention, a tool is passed through the respective transit station 32 for the tool change. The tool is supplied to the assigned transit station with respect to the movement space of the tool carriers 14, 16 by these tool carriers, or fetched therefrom. The transit stations 32 can be non-displaceably arranged with respect to the machine frame 18, i.e. they do not move.

However, they may also be movable via a slide 37 which is movable in the Z-direction, as shown in FIGS. 4 and 5. Removal or insertion of the tools then takes place via a slide movement, when the tool carriers 14, 16 cannot themselves carry out a lifting movement in the Z-direction. In particular, no movement is provided inside the movement space 26.

The tools are fetched from the transit station(s) 32 by the transporting apparatus 42, which in particular comprises a cross slide 44 and supplied to the tool storing apparatus 28 for depositing, or tools provided for a tool change are fetched from the tool storing apparatus 28 by the cross slide 44 and supplied to the transit station(s) 32. The transporting apparatus 42 moves, in this case, outside the movement space 26, ensuring freedom from collision with the tool carriers 14, 16.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A tool changing device for a machine tool with at least one tool carrier, comprising:
    at least one transit station operatively positioned to receive a tool introduced into an intermediate position within the at least one transit station via an inward transit direction and operatively positioned to release the tool via an outward transit direction;
    a holding apparatus adapted for holding the tool at the intermediate location within at the at least one transit station, wherein the holding apparatus comprises opposing, rotatable gripper elements such that, depending on the rotary position of the gripper elements, the gripper elements can receive a tool introduced via the inward transit direction, positively hold a tool in the intermediate position, or release a tool via the outward transit direction; and
    wherein, at the at least one transit station, the tool can be detached from the at least one tool carrier, affixed to the at least one tool carrier, or both.

2. The tool changing device according to claim 1, wherein at least one transit station is assigned to the at least one tool carrier.

3. The tool changing device according to claim 1, wherein at least one transit station is assigned to each tool carrier.

4. The tool changing device according to claim 1, wherein the tool changing device is configured such that a tool introduced from the at least one tool carrier into the at least one transit station travels in a first transit direction and a tool extracted from the at least one transit station by the at least one tool carrier travels in a second transit direction, wherein the first transit direction and the second transit direction are substantially oriented in opposite directions.

5. The tool changing device according to claim 1, wherein the tool changing device is configured such that a tool introduced from a tool storing apparatus into the at least one transit station travels in a first transit direction and a tool extracted from the at least one transit station for return to a tool storing apparatus travels in a second transit direction, wherein the first transit direction and the second transit direction are substantially oriented in opposite directions.

6. The tool changing device according to claim 1, wherein a first transit station for detaching a tool from the tool carrier and a second transit station for fixing a tool to the tool carrier are assigned to the at least one tool carrier.

7. The tool changing device according to claim 1, wherein the inward transit direction and the outward transit direction form a transit direction.

8. The tool changing device according to claim 7, wherein the transit direction is a vertical direction.

9. The tool changing device according to claim 7, wherein the tool changing device is configured to provide a first transit direction for detaching a tool from the tool carrier and passing it to a tool storing apparatus and a second transit direction for introducing a tool from a tool storing apparatus and fixing the tool to the tool carrier, the first and second transit directions being substantially oriented in opposite directions.

10. The tool changing device according to claim 1, wherein the at least one transit station is arranged in a movement space or at the edge of a movement space of the at least one tool carrier.

11. The tool changing device according to claim 1, wherein the at least one transit station is rigidly arranged with respect to a machine frame of the machine tool.

12. The tool changing device according to claim 1, wherein the at least one transit station is movably arranged with respect to a machine frame of the machine tool.

13. The tool changing device according to claim 12, wherein the at least one transit station is displaceable transversely with respect to the inward transit direction and outward transit direction.

14. The tool changing device according to claim 12, wherein the at least one transit station is arranged on a movable slide.

15. The tool changing device according to claim 14, wherein the slide is driven.

16. The tool changing device according to claim 12, wherein the at least one transit station is movable between an inward transit position and an outward transit position.

17. The tool changing device according to claim 16, wherein during the movement between the inward transit position and the outward transit position, a tool is held by the assigned transit station.

18. The tool changing device according to claim 1, wherein the at least one transit station is connected to a tool storing apparatus, so tools from the tool storing apparatus are adapted to be supplied to the transit station and tools are adapted to be supplied from the transit station to the tool storing apparatus.

19. The tool changing device according to claim 1, wherein a transporting apparatus for the transportation of tools between the at least one transit station and a tool storing apparatus moves outside a movement space of the at least one tool carrier.

20. The tool changing device according to claim 19, wherein the transporting apparatus comprises a cross slide.

21. The tool changing device according to claim 1, wherein a detachment apparatus is provided for the at least one transit station for detaching a tool from a tool carrier.

22. The tool changing device according to claim 1, wherein a fixing apparatus is provided for the at least one transit station for fixing a tool to a tool carrier.

23. The tool changing device according to claim 1, wherein in the event of a movement of the tool into the intermediate location, the at least one transit station is configured to block movement of the tool in the opposite direction.

24. The tool changing device according to claim 1, wherein at least one separate delivery location and fetching location for the tool are provided as intermediate locations.

25. The tool changing device according to claim 1, further comprising a blocking device adapted for blocking the rotary movement of the gripper elements.

26. The tool changing device according to claim 25, wherein the blocking apparatus comprises a spring-loaded pawl, which is immersable in a blocking receiver of a gripper element.

27. The tool changing device according to claim 1, wherein the gripper elements are configured such that a rotary movement is initiated via a movement of the tool.

28. The tool changing device according to claim 1, wherein the shape of the gripper elements is adapted to a tool to be held.

29. The tool changing device according to claim 1, wherein the gripper elements are rotatable in an angle range, which is a part angle of 360°.

30. The tool changing device according to claim 1, wherein the gripper elements are rotatable in a full angle range.

31. The tool changing device according to claim 1, wherein the axis of rotation of the gripper elements lies transverse with respect to the inward and outward transit directions.

32. The tool changing device according to claim 1, wherein the gripper elements are configured as gripper forks.

33. The tool changing device according to claim 1, wherein the gripper elements each have a plurality of receivers for a tool.

34. The tool changing device according to claim 33, wherein adjacent receivers are separated by an arm.

35. The tool changing device according to claim 33, wherein the gripper elements are star-shaped.

36. The tool changing device according to claim 1, wherein the directions of rotation of the opposing gripper elements are opposing.

* * * * *